(12) United States Patent
Gross

(10) Patent No.: US 10,786,068 B1
(45) Date of Patent: Sep. 29, 2020

(54) DUAL STRIP MAGNETIC FASTENING

(71) Applicant: Aaron Gross, Winfield, MO (US)

(72) Inventor: Aaron Gross, Winfield, MO (US)

( * ) Notice: Subject to any disclaimer, the term of this patent is extended or adjusted under 35 U.S.C. 154(b) by 0 days.

(21) Appl. No.: 16/352,707

(22) Filed: Mar. 13, 2019

(51) Int. Cl.
*A45F 3/14* (2006.01)
*F16B 1/00* (2006.01)
*A45F 5/00* (2006.01)

(52) U.S. Cl.
CPC ............ *A45F 3/14* (2013.01); *F16B 1/00* (2013.01); *A45F 2003/142* (2013.01); *A45F 2005/008* (2013.01); *F16B 2001/0035* (2013.01)

(58) Field of Classification Search
CPC .......... A45F 3/14; A45F 2200/0516; A45F 2005/008; A45F 2200/0525; A45C 13/1069; A45C 2011/002
See application file for complete search history.

(56) References Cited

U.S. PATENT DOCUMENTS

| | | | | |
|---|---|---|---|---|
| 3,886,508 | A * | 5/1975 | Lavrard | A41D 13/0012 335/285 |
| 6,530,508 | B1 * | 3/2003 | Devine | A45F 5/00 224/183 |
| 7,146,651 | B1 * | 12/2006 | Lapin | A41D 19/01594 2/338 |
| 8,925,423 | B1 * | 1/2015 | Rotolo | B67B 7/16 7/151 |
| 9,648,941 | B1 * | 5/2017 | Gonzalez | A45F 5/00 |
| 9,723,116 | B2 | 8/2017 | Georges | |
| 9,737,130 | B1 * | 8/2017 | Frontino | A45F 5/00 |
| 10,480,711 | B1 * | 11/2019 | Tran | F16M 13/04 |
| 2004/0206792 | A1 | 10/2004 | Mineer | |
| 2006/0011679 | A1 * | 1/2006 | Santiago | B25H 3/00 224/222 |
| 2007/0006367 | A1 * | 1/2007 | Newman | A45F 3/12 2/338 |
| 2008/0061099 | A1 | 3/2008 | Tilby | |
| 2009/0050657 | A1 * | 2/2009 | Woolery | A45F 3/14 224/183 |
| 2010/0051656 | A1 | 3/2010 | McCarty et al. | |
| 2014/0263495 | A1 * | 9/2014 | Koch | A45F 5/00 224/222 |
| 2015/0090750 | A1 * | 4/2015 | Coleman | F42B 39/02 224/222 |
| 2015/0305735 | A1 * | 10/2015 | Gorek | A61B 17/06114 606/147 |
| 2016/0106172 | A1 * | 4/2016 | Kelson | A45F 5/00 132/201 |
| 2016/0199989 | A1 * | 7/2016 | Randell | B26B 19/3813 224/183 |
| 2016/0324303 | A1 * | 11/2016 | Mudge | G01C 3/00 |
| 2017/0007008 | A1 * | 1/2017 | Pascale | A45F 3/00 |
| 2017/0146316 | A1 * | 5/2017 | Willard | F41C 33/007 |
| 2017/0208926 | A1 | 7/2017 | Geller | |
| 2018/0049493 | A1 * | 2/2018 | Graves | A41D 27/20 |

(Continued)

*Primary Examiner* — Brian D Nash
(74) *Attorney, Agent, or Firm* — Nwamu, P.C.

(57) ABSTRACT

Dual strip magnetic fastening. The dual strip magnetic fastening includes a pair of fastener strips including an arm fastener strip and a device fastener strip. The arm fastener strip includes magnets appropriately oriented and disposed. The device fastener strip includes magnetic material appropriately oriented and disposed. The dual strip magnetic fastening system or method may retain a hunting accessory device.

9 Claims, 6 Drawing Sheets

(56) References Cited

U.S. PATENT DOCUMENTS

2018/0281660 A1    10/2018  Dahlin
2018/0310674 A1*   11/2018  Teal .......................... A45F 5/00
2018/0325228 A1*   11/2018  Leimer .............. A45C 13/1092
2019/0037166 A1*    1/2019  Davis ....................... A41D 1/04

* cited by examiner

DUAL STRIP MAGNETIC FASTENING

BACKGROUND OF THE DISCLOSURE

Hunters typically use various accessories for hunting. One such accessory is a hunting knife. Another accessory is a pair of binoculars that can be used to view an intended target. The binoculars might be held around the hunter's neck area with a cord. It is within the aforementioned context that a need for the present disclosure has arisen

BRIEF SUMMARY OF THE DISCLOSURE

Various aspects of a dual strip magnetic fastening system can be found in exemplary examples of the present disclosure.

In one example, the dual strip magnetic fastening includes a pair of fastener strips including an arm fastener strip and a device fastener strip. The arm fastener strip has an upper layer and a lower layer. A magnet is disposed between the layers. The device fastener strip also has an upper layer and a lower layer with a magnetic material disposed therein between. Before beginning the hunt, the arm fastener strip may be wrapped around an upper arm of a user. The device fastener strip may be wrapped around a device such as a hunting accessory device. When during the hunting activity, the user brings the hunting accessory device within close proximity of the arm fastener strip magnet, the enclosed hunting accessory device is attracted to the arm fastener strip and retained thereon on the upper arm of a user. Here, magnetic attraction occurs with minimal sound to avoid disruption of the hunting activity by alerting the target animal to the hunter's presence.

A further understanding of the nature and advantages of the present disclosure herein may be realized by reference to the remaining portions of the specification and the attached drawings. Further features and advantages of the present disclosure, as well as the structure and operation of various examples of the present disclosure, are described in detail below with respect to the accompanying drawings. In the drawings, the same reference numbers indicate identical or functionally similar elements.

DETAILED DESCRIPTION OF THE DISCLOSURE

Reference will now be made in detail to the examples of the disclosure, examples of which are illustrated in the accompanying drawings. While the disclosure will be described in conjunction with the one or more examples, it will be understood that the examples are not intended to limit the disclosure to these examples. On the contrary, the disclosure is intended to cover alternatives, modifications and equivalents which may be included within the spirit and scope of the disclosure as defined by the appended claims. Furthermore, in the following detailed description of the present disclosure, numerous specific details are set forth to provide a thorough understanding of the present disclosure. However, it will be obvious to one of ordinary skill in the art that the present disclosure may be practiced without these specific details. In other instances, well-known methods, procedures, components, and circuits have not been described in detail as to not unnecessarily obscure aspects of the present disclosure.

Figure 1:
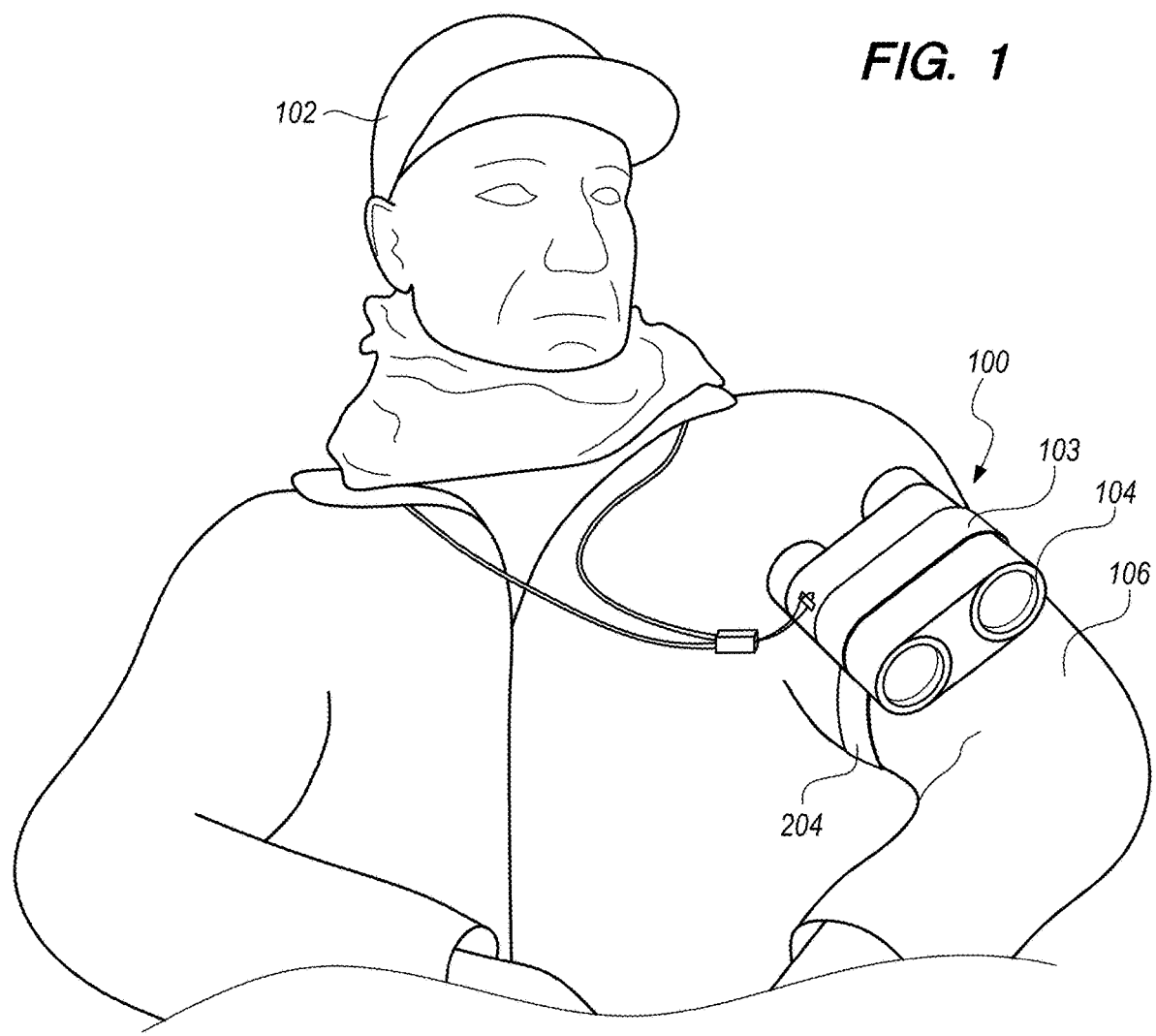
FIG. 1 illustrates a dual fastener strips system employed with a hunting accessory device according to an example of the present disclosure.

FIG. 1 illustrates dual fastener strips system 100 according to an example of the present disclosure.

In FIG. 1, dual fastener strips system 100 is shown as utilized by a user 102. Here, as shown, the dual fastener strips system 100 facilitates attachment of a hunting accessory device 104 on the user's upper arm 106. An example of such a hunting accessory device is a pair of binoculars.

Figure 2:
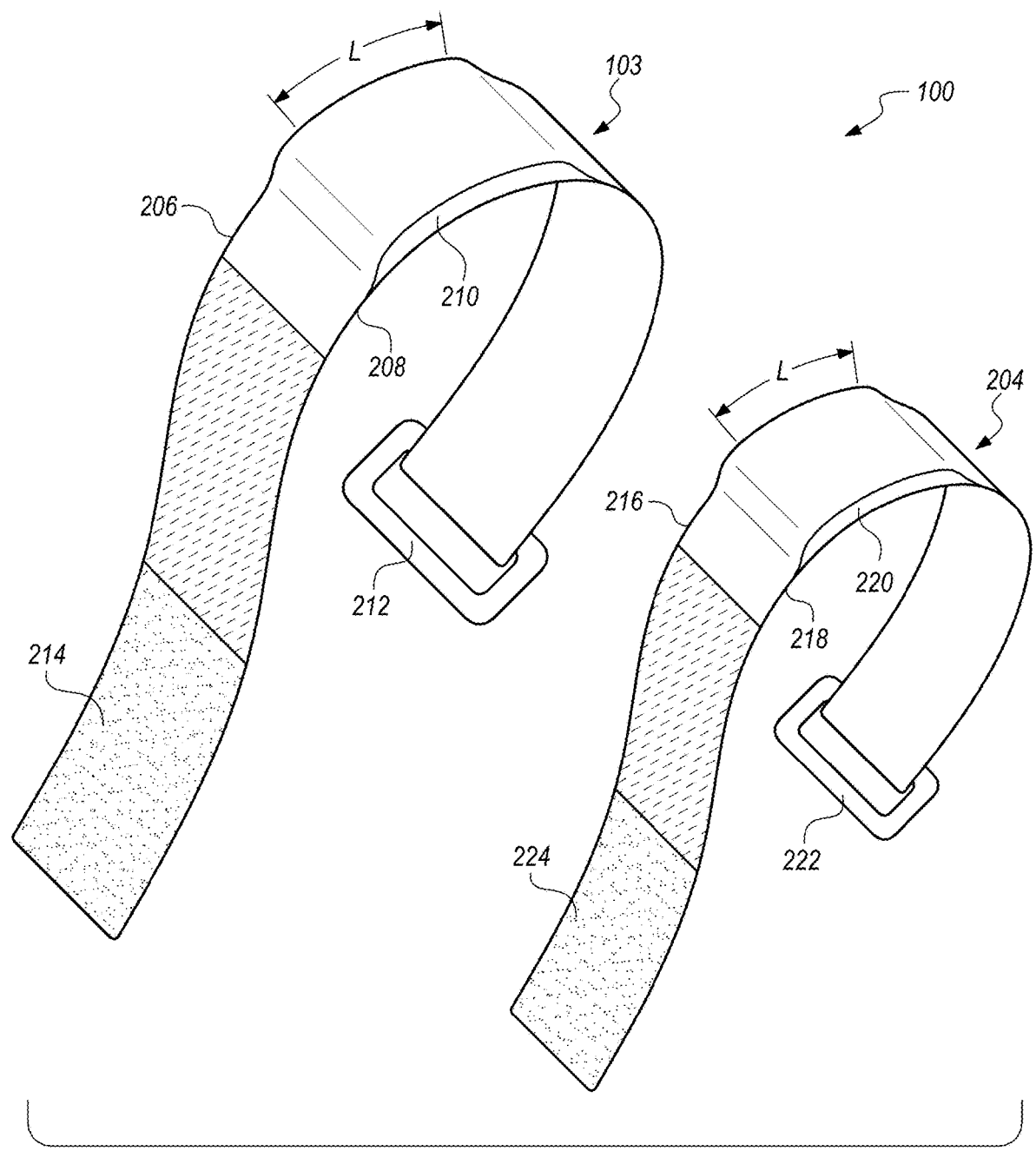
FIG. 2 illustrates a dual fastener strips system according to an example of the present disclosure.

FIG. 2 illustrates dual fastener strips system 100 according to an example of the present disclosure.

In FIG. 2, dual fastener strips system 100 includes device fastener strip 103 and arm fastener strip 204 that work in tandem with each other. Device fastener strip 103 extends transversely from a first coupling end 212 to a second coupling end 214. Although the first coupling end 212 is shown with a buckle and the second coupling end 214 without a buckle, the coupling ends may incorporate any fastening system that facilitates fastening of two ends in an adjustable manner. For example, first coupling end 212 and second coupling end 214 may comprise a hook and loop system such as Velcro®. Or one end can double back and be fixed at a certain distance.

In FIG. 1, device fastener strip 103 includes an upper layer 206 as well as a lower layer 208. Each one of the upper and lower layers might be made of heavy canvas fabric or polypropylene, might be waterproof, or may be manufactured with any material consistent with the scope of the present disclosure.

Lower layer 208 is fastened to upper layer 206 around its edges in such a manner as to retain a magnetic material 210 therein between. Although shown as two layers, the upper and lower layers may be a single layer with the magnetic material 210 encapsulated in between.

Here, magnetic material 210 is positioned substantially midway between first coupling end 212 and second coupling end 214. By positioning magnetic material 210 substantially midway of the device fastener strip 103, the present disclosure permits the magnetic material 210 to be positioned on the top area of user's upper arm 106. Moreover, the substantially midway positioning of magnetic material 210 also permits device fastener strip 103 to be aligned and positioned on the top surface area of hunting accessory device 104.

In FIG. 2, magnetic material 210 extends at least along a portion of a length of device fastener strip 103. As can be seen, magnetic material 210 extends a length L, as shown. Magnetic material 210 is also oriented parallel to the surface of upper layer 206 and lower layer 208. Magnetic material 210 may be steel, iron, or other such magnetic material.

Referring now to upper layer 206 and lower layer 208, the exemplary width of both layers is two inches. An exemplary thickness is one-eighth of an inch. The thickness of the magnetic material 210 may vary depending on the size of the hunting accessory device 104 to be attached. An exemplary length of device fastener strip 103 may be between eight and twenty-four inches and can be adjusted as needed depending upon the particular application.

In FIG. 2, dual fastener strips system 100 further includes arm fastener strip 204 in addition to device fastener strip 103 as previously noted. Although arm fastener strip 204 has been shown smaller and of shorter length than device fastener strip 103, device fastener strip 204 may be longer, wider and thicker than device fastener strip 103 depending on the particular application.

Here, arm fastener strip 204 includes an upper layer 216 as well lower layer 218. Upper layer 216 forms the exterior or top layer surface of arm fastener strip 204. Lower layer 218 forms the interior surface of arm fastener strip 204. The edges of lower layer 218 are fastened to upper layer 216 to retain a magnet 220 between upper layer 216 and lower layer 218. Here, arm fastener strip 204 extends transversely from a first coupling end 222 to a second coupling end 224. As with device fastener strip 103, although first coupling end 222 is shown with a buckle and the second coupling end 224 without, the coupling ends may be any fastening system such as Velcro® that facilitates fastening of two ends in an adjustable manner.

Magnet 220 is positioned substantially midway between first coupling end 222 and second coupling end 224. The length of magnet 220 is shown as L and is configured to match the length of magnetic material 210 of device fastener strip 103. In this manner, the attraction between magnet 220 and magnetic material 210 is enhanced because the lines of flux between both materials are optimized.

Figure 3A:
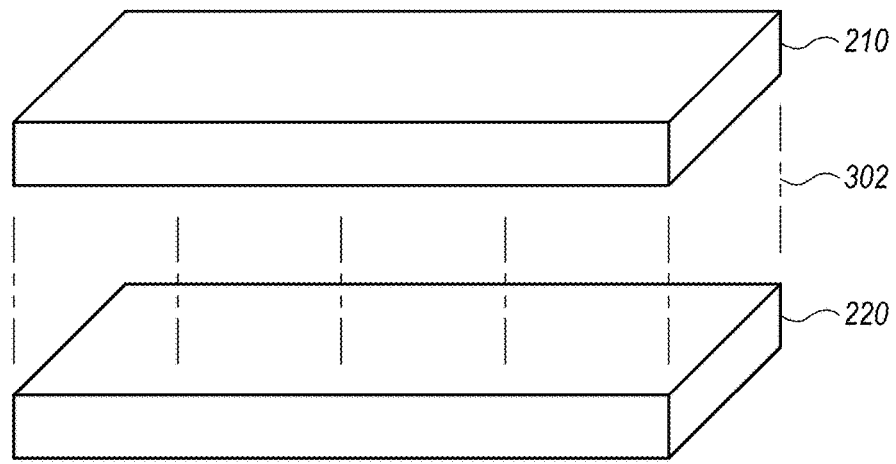
FIG. 3A illustrates an example of a matching magnet and magnetic material according to the present disclosure.

In other examples, the present disclosure optimizes lines of flux and hence promotes maximum attraction between magnet 220 and magnetic material 210. For example, in FIG. 3A, magnetic material 210 and magnet 220 are formed to have unique shapes that match each other. Thus, in FIG. 3A magnetic material 210 and magnet 220 are substantially rectangular and have substantially the same shape and dimensions to match each other. Flux lines 302 between magnetic material 210 and magnet 220 are focused between the magnet 220 and the magnetic material 210. There are no stray lines of flux that can possibly reduce attraction between the magnet 220 the magnetic material 210.

Figure 3B:
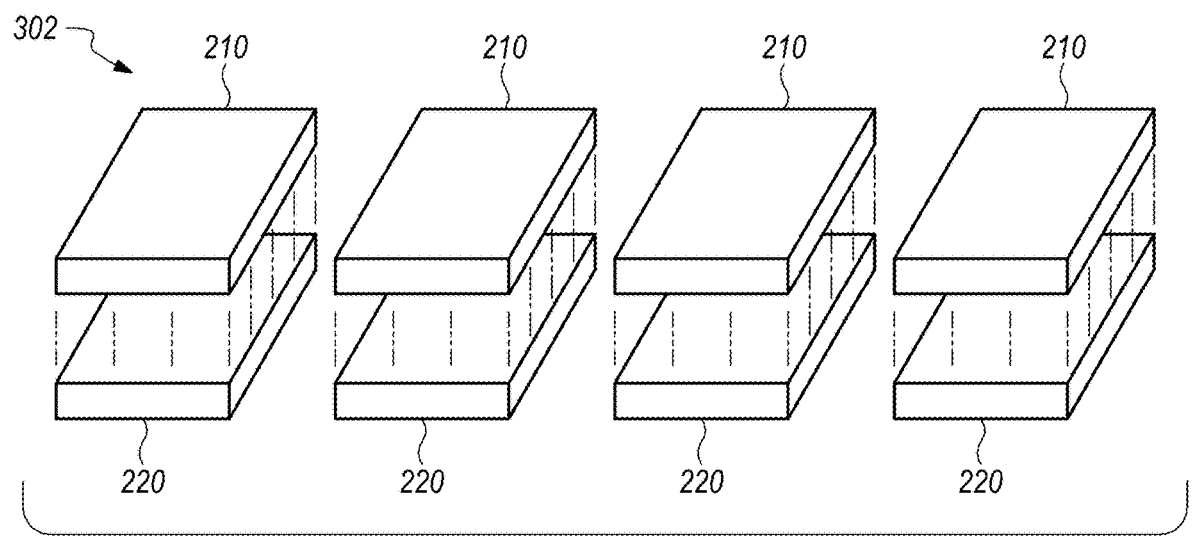
FIG. 3B illustrates another example of a matching magnet and magnetic material according to the present disclosure.

Similarly, in FIG. 3B, both magnetic material 210 and magnet 220 are rectangular shaped and both match each other. Unlike FIG. 3A, however, the magnetic materials and magnets are spaced apart from each other to maintain flexibility of the strips while providing maximum attraction. Again, flux lines 302 are focused between both the magnetic material 210 and the magnet 220 so that no stray lines of flux exist.

Figure 4:
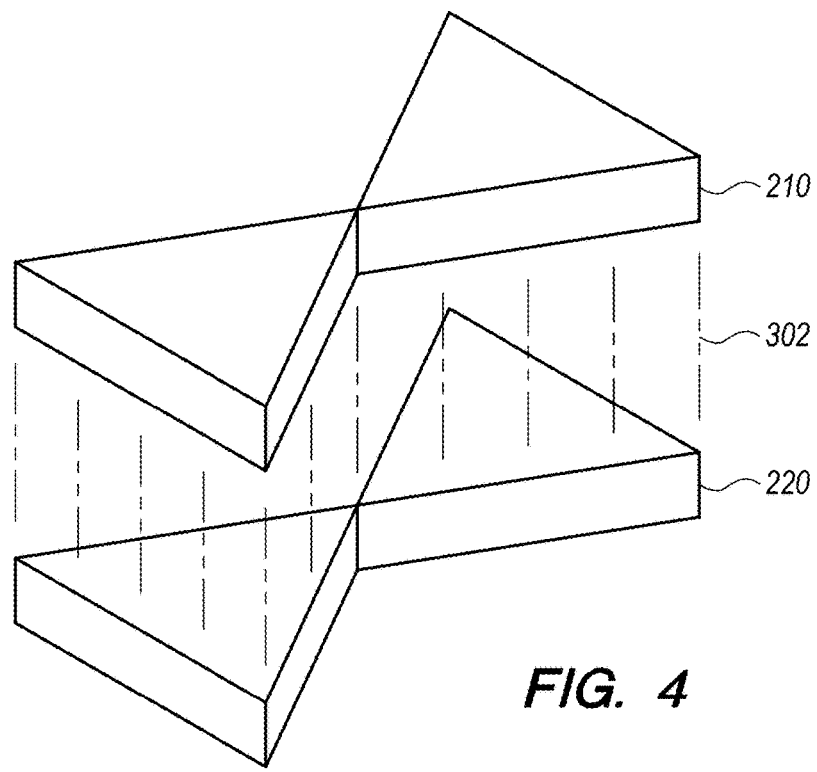
FIG. 4 illustrates another example of a matching magnet and magnetic material according to the present disclosure.

In a similar manner, in FIG. 4 magnetic material 210 is hourglass shaped so that magnetic material 210 and magnet 220 both match each other. Again, flux lines 302 are focused between both the magnetic material 210 and the magnet 220 so that no stray lines of flux exist.

Figure 5:
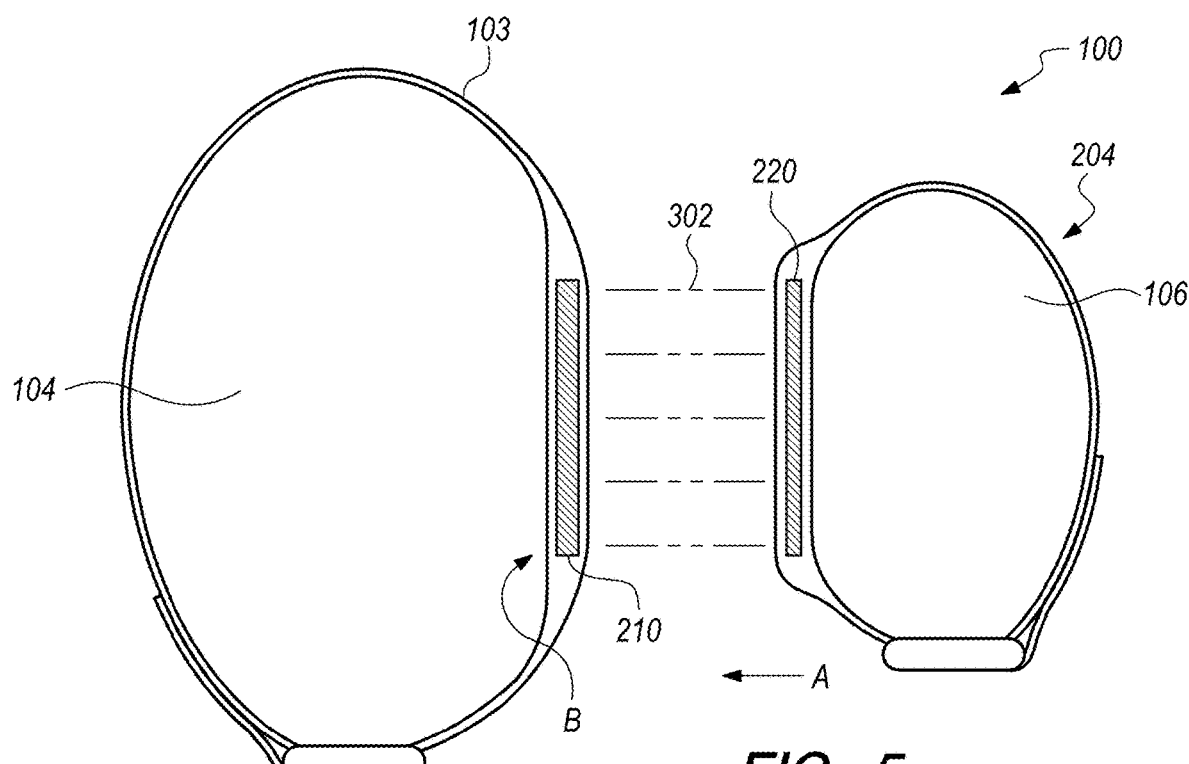
FIG. 5 shows a top plan view of a device fastener strip adjacent to an arm fastener strip in use according to an example of the present disclosure.
Figure 6:
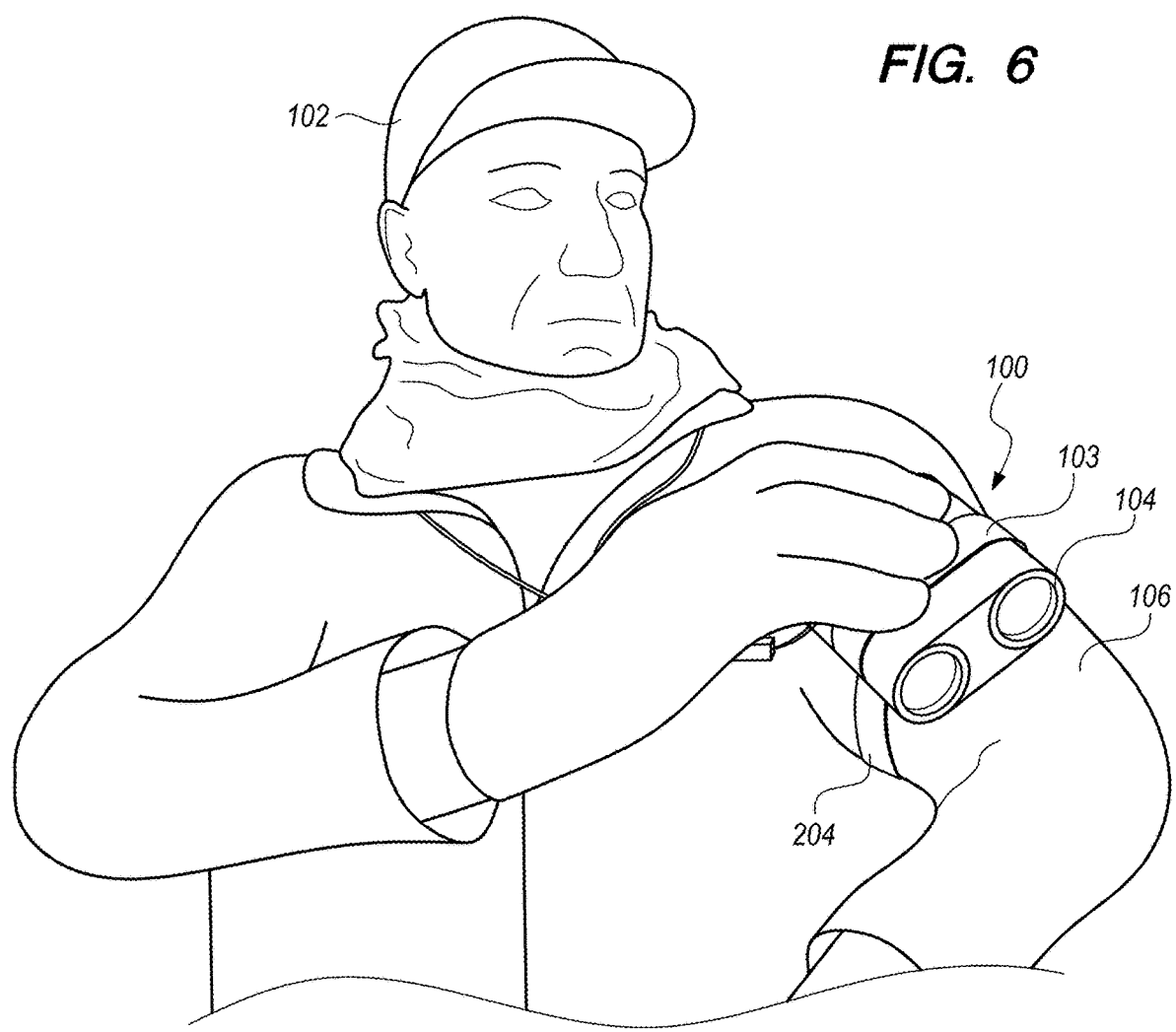
FIG. 6 illustrates a user reaching for an attached hunting accessory device according to an example of the present disclosure.
Figure 7:
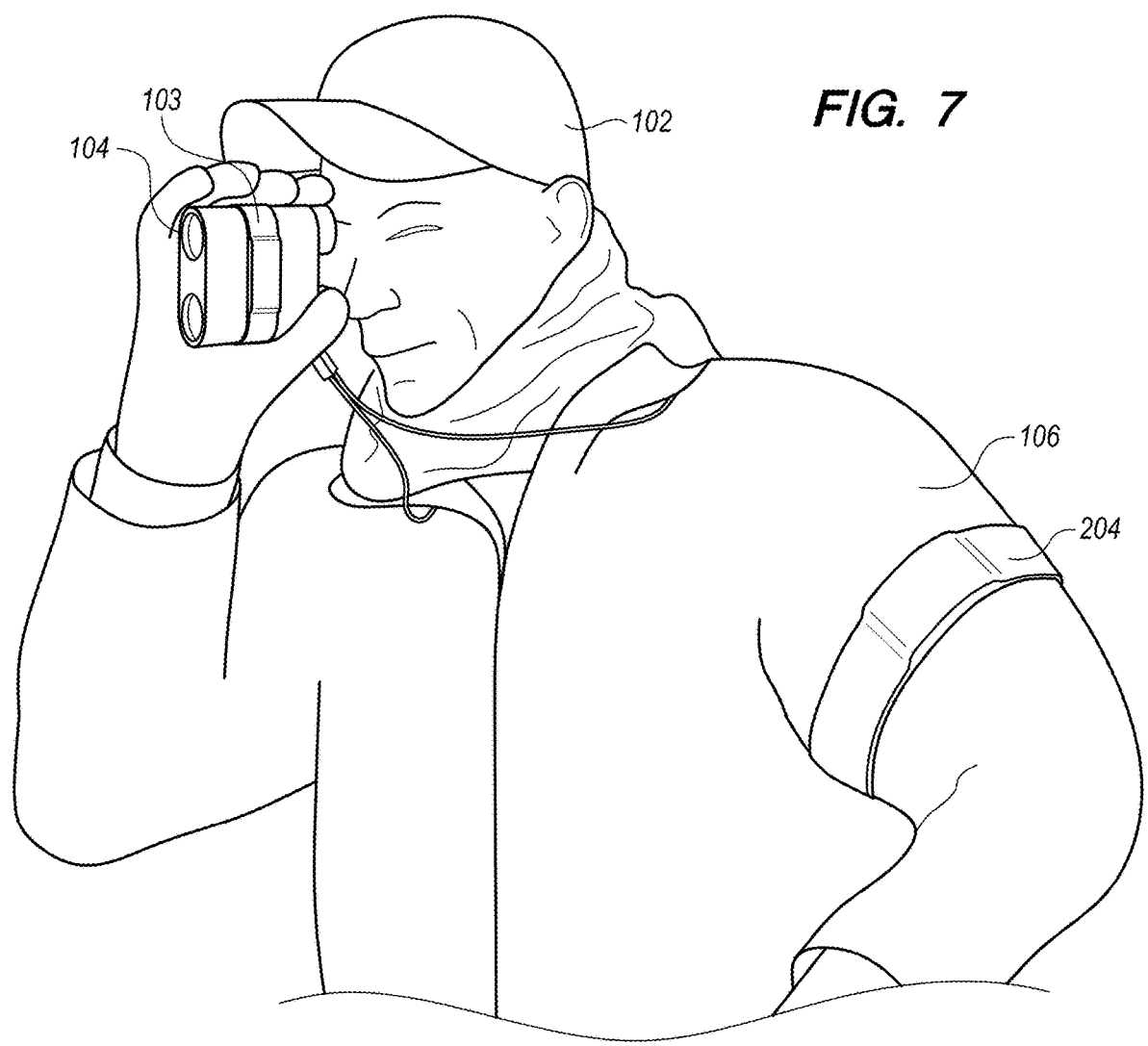
FIG. 7 illustrates a user that is utilizing a hunting accessory device according to an example of the present disclosure.

FIGS. 5, 6 and 7 illustrate operation of dual fastener strips system 100. FIG. 5 shows a top plan view of device fastener strip 103 adjacent to arm fastener strip 204 in use according to an example of the present disclosure. Specifically, device fastener strip 103 as attached to hunting accessory device 104 is shown adjacent to arm fastener strip 204 that is attached to upper arm 106 of user 102.

In FIG. 5, user 102 begins by attaching arm fastener strip 204 to the user's upper arm 106. As can be seen in FIG. 7, arm fastener strip 204 is attached to the user's upper arm 106. In FIG. 5, the arm fastener strip 204 is wrapped around the user's upper arm 106 so that magnet 220 is oriented toward the front area A (chest area of the user).

Next, the device fastener strip 103 is wrapped around hunting accessory device 104. A hunting accessory device 104 can be any device that facilitates hunting, such as for example, a viewfinder or binoculars or other comparable accessories. As another example, a hunting accessory device 104 might be the butt of a rifle.

Here, device fastener strip 103 is wrapped around hunting accessory device 104 so that magnetic material 210 faces a bottom surface B of hunting accessory device 104. In this manner, when device fastener strip 103 is brought into close proximity with arm fastener strip 204, as shown by flux lines 302, magnetic material 210 is attracted to magnet 220. Hence, hunting accessory material 104 rests on the upper arm 106 of user 102.

In this example, during a hunting exercise while using the dual fastener strips system 100, user 102 might have a neck strap attached to hunting accessory device 104 so that hunting accessory device 104 is hanging around user 102's neck. In another example, hunting accessory device 104 is on a carabiner style clip attached to arm fastener strip 204.

Prior to shooting a target, user 102 uses hunting accessory device 104 for viewing a target. After viewing the target, user 102 then needs to silently place the hunting accessory device 104 in its rest position on the user's upper arm 106. When user 102 sights an animal, complete silence and expediency are of utmost importance. Here, user 102 can easily and silently detach the hunting accessory device 104, as shown in FIG. 6, from arm fastener strip 204. Then when the user 102 has completed viewing of a target, hunting accessory device 104 can be quickly and silently returned to a rest position where the hunting accessory device 104 is silently attracted by magnet 220 on the user's upper arm 106.

While the above is a complete description of exemplary specific examples of the disclosure, additional examples are also possible. Thus, the above description should not be taken as limiting the scope of the disclosure which is defined by the appended claims along with their full scope of equivalents.

I claim:

1. A system comprising:
an opposing pair of fastener strips including an arm fastener strip to wrap around an upper arm of a user and a device fastener strip, the device fastener strip to wrap around a device:
the arm fastener strip having an upper layer and a lower layer, the lower layer being attached along its edges to the upper layer to retain at least one magnet therein, the arm fastener strip extending transversely from a first male coupling end to a first female coupling end, wherein the first male coupling end is to engage the first female coupling end to secure the arm fastener strip to the upper arm of the user; wherein said magnet is located midway between the first male and the first female second coupling ends, said magnet having a length that extends along at least a portion of a length of the arm fastener strip, and said magnet being oriented parallel to the surface of the upper and lower layers;

the device fastener strip having an upper layer and a lower layer, the lower layer being attached along its edges to the upper layer to retain at least one magnetic material therein, the device fastener strip extending transversely from a second-male coupling end to a second female coupling end, wherein the second male coupling end is to engage the second female coupling end to secure the device fastener strip to the device, wherein said magnetic material is located midway between the second male coupling end and the second female coupling ends of the device fastener strip, said magnetic material having a length that extends along at least a portion of a length of the device fastener strip, said magnet material being oriented parallel to the surface of the upper and lower layers of the device fastener strip, wherein when the arm fastener strip is wrapped around the upper arm of the user, the magnet is oriented on the front of the upper arm, wherein when the device fastener strip is wrapped around a device, the magnet material is oriented on a backside of said device, and when the user during a hunting activity brings the device within close proximity of the magnet of the arm fastener strip, the magnetic material of the device fastener strip is attracted to the magnet of the arm fastener strip to retain the device on the upper arm area of the user, said magnetic attraction is to occur with minimal sound to avoid disruption of the hunting activity.

2. The system of claim 1 wherein the magnetic material and the magnet are contoured in the same shape.

3. The system of claim 1 wherein the arm fastener strip includes a plurality of spaced-out magnets.

4. The system of claim 3 wherein the device fastener strip includes a plurality of spaced-out magnetic materials that match, each of which is attracted to and matches a corresponding one of a plurality of spaced-out magnets.

5. The system of claim 1 wherein the device is a hunting accessory.

6. An apparatus comprising:
 a pair of fastener strips that are unattached to each other, the pair of fastener strips including a first fastener strip to wrap around the arm of a user and a second fastener strip to wrap around a device;
 the first fastener strip having a magnet disposed within said first fastener strip, the first fastener strip extending transversely between a first male coupling end and a first female coupling end, the first male coupling end to engage the first female coupling end to secure the first fastener strip on the user's upper arm, wherein said magnet is disposed at a position equidistant from the first male coupling end and the first female coupling end, said magnet having a length that extends along at least a portion of a length of the first fastener strip, and said magnet being oriented parallel to an axis of the first fastener strip;
 the second fastener strip having a magnetic material disposed within the second fastener strip, the second fastener strip extending transversely from a second male coupling end to a second female coupling end, wherein said magnetic material is disposed at a position equidistant from the second male coupling end and the second female coupling end, said magnetic material having a length that extends along at least a portion of a length of the second fastener strip, said magnet material being oriented parallel to an axis of the second fastener strip, wherein the first fastener strip is to wrap around the upper arm of the user and the magnet is to orient on the front of the upper arm, wherein the second fastener strip is to wrap around the device and the magnetic material is to orient on a backside of said device, and wherein the magnet of the first fastener strip is to attract the magnetic material of the second fastener strip when the device and its magnetic material is in close proximity to the magnet to retain the device on the upper arm area of the user.

7. The apparatus of claim 6 wherein the first fastener strip includes a plurality of spaced-out magnets.

8. A method comprising:
 providing an opposing pair of fastener strips including an arm fastener strip to wrap around an upper arm of a user and a device fastener strip, the device fastener strip to wrap around a device,
 the arm fastener strip having an upper layer and a lower layer,
 attaching the lower layer along its edges to the upper layer to retain at least one magnet therein, the arm fastener strip extending transversely from a first male coupling end to a first female coupling end, wherein the first male coupling end is to engage the first female coupling end to secure the arm fastener strip to the upper arm of the user,
 locating said magnet midway between the first male and the first female coupling ends, said magnet having a length that extends along at least a portion of a length of the arm fastener strip, and said magnet being oriented parallel to the surface of the upper and lower layers;
 the device fastener strip having an upper layer and a lower layer,
 attaching the lower layer along its edges to the upper layer to retain at least one magnetic material therein, the device fastener strip extending transversely from a second male coupling end to a second female coupling end, wherein the second male coupling end is to engage the second female coupling end to secure the device fastener strip to the device,
 locating said magnetic material midway between the second male coupling end and the second female coupling end of the device fastener strip, said magnetic material having a length that extends along at least a portion of a length of the device fastener strip, said magnet material being oriented parallel to the surface of the upper and lower layers of the device fastener strip,
 wherein the arm fastener strip is to wrap around the upper arm of the user and to orient the magnet on the front of the upper arm, wherein the device fastener strip is to wrap around the device and to orient the magnetic material on a backside of said device,
 and wherein when the user during a hunting activity brings the device and magnetic material within close proximity of the magnet, the magnetic material of the device fastener strip is attracted to the magnet of the arm fastener strip to retain the device on the upper arm of the user, said magnetic attraction is to occur with minimal sound to avoid disruption of the hunting activity.

9. The method of claim 8 wherein the magnetic material and the magnet are contoured in the same shape.

* * * * *